United States Patent
Semin et al.

[15] 3,643,518
[45] Feb. 22, 1972

[54] BELT AND BELT DRIVE ASSEMBLY

[72] Inventors: Roy E. Semin; Joseph C. Geist, both of Lincoln, Nebr.

[73] Assignee: The Goodyear Tire & Rubber Company, Akron, Ohio

[22] Filed: June 8, 1970

[21] Appl. No.: 44,452

[52] U.S. Cl. ................................74/219, 74/234, 74/237
[51] Int. Cl. ....................F16g 7/02, F16g 1/22, F16h 5/20
[58] Field of Search ............74/226, 232, 237, 231 P, 231 C, 74/233, 234, 219

[56] References Cited

UNITED STATES PATENTS

| | | | |
|---|---|---|---|
| 3,151,491 | 10/1964 | Case | 74/233 X |
| 2,831,359 | 4/1958 | Carle | 74/233 |
| 2,894,405 | 7/1959 | Carle | 74/230.17 |
| 3,478,613 | 11/1969 | Waugh et al. | 74/233 |

*Primary Examiner*—Leonard H. Gerin
*Attorney*—F. W. Brunner and Ronald P. Yaist

[57] ABSTRACT

A flexible power transmission belt used in conjunction with toothed and/or grooved pulleys of a belt drive assembly and capable of driving from opposite portions thereof. The belt includes one driving portion which is preferably transversely toothed to mesh with toothed pulleys and an opposite longitudinal plural V-ribbed driving portion which engages at least one grooved pulley. The belt is particularly useful in belt drive assemblies in which the arc of contact between the plural V-ribbed driving portion of the belt and the pulley is small or relatively small with the required high tension materially increasing stresses on the tension member of the belt.

22 Claims, 6 Drawing Figures

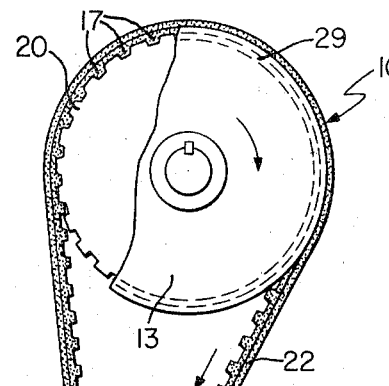
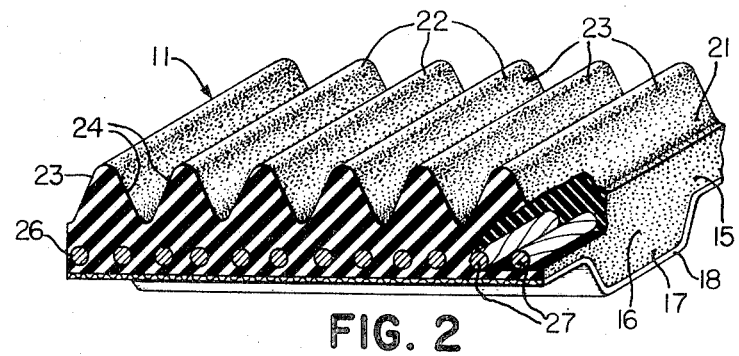
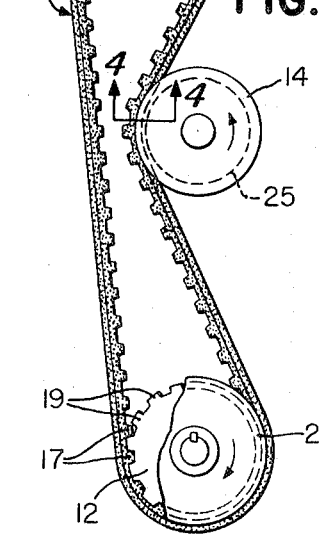
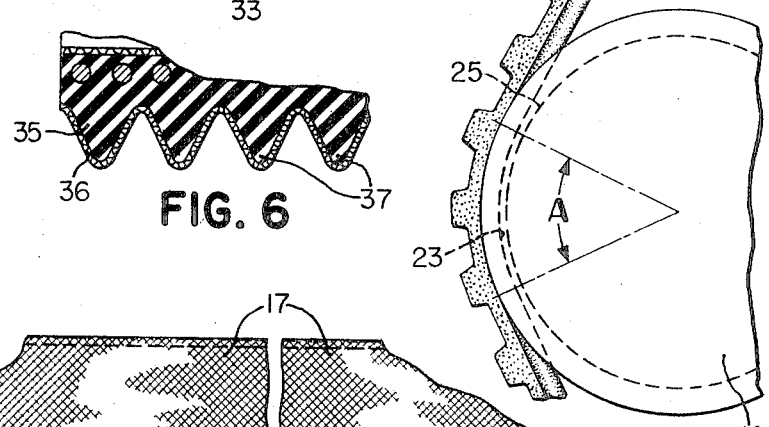
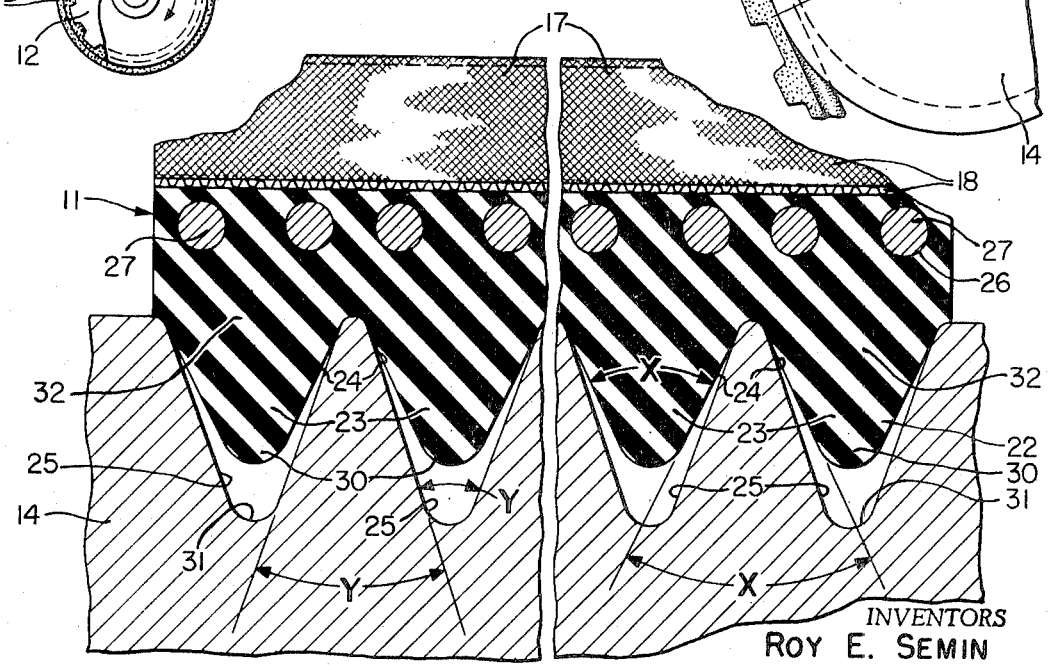

3,643,518

BELT AND BELT DRIVE ASSEMBLY

BACKGROUND OF THE INVENTION

This invention relates to flexible power transmission belts used in conjunction with toothed and grooved pulleys of a belt drive assembly in which the belt drives from opposite portions thereof to transmit power between the pulleys. This invention relates particularly to belt drive assemblies in which the arc of contact between one of the driving portions of the belt and the pulley is relatively small with the required high tension materially increasing stresses on the tension member of the belt.

Power transmission belts used with toothed pulleys are well known in the art. These belts include a plurality of driving teeth or cogs extending transversely of the belt which mesh with the teeth of the toothed pulley or gear in order to perform their driving function. The most widely used of these toothed or cogged belts is the so-called synchronous drive belt which is manufactured from flexible resilient material such as natural or synthetic rubber. These belts are engineered and manufactured with pitch, tooth depth, width and other measurements accurate to a precise degree with extremely close tolerances being maintained. In addition, a high-strength tension member of essentially inextensible material is provided substantially on the dedendum line of the teeth to prevent undue stretchability of the belt. This belt construction allows the flexible, resilient belt teeth to mesh without change of pitch with teeth of the toothed pulleys with the belt thereby functioning as a synchronizing belt. The operation and advantages of synchronous drive belts is fully described in Case U.S. Pat. No. 2,507,852.

Power transmission belts which operate in conjunction with grooved pulleys are likewise well known in the art. One such belt is the V-type transmission belt in which the sides of the belt wedgingly engage the sides of grooved pulleys in order to perform their driving function. Other type belts are also adapted to operate in conjunction with grooved pulleys. For example, J Adams, Jr. U.S. Pat. No. 2,728,239 describes an essentially flat power transmission belt having a plurality of longitudinal, substantially V-shaped ribs molded on the inner surface thereof which are intended to mate or register in corresponding V-shaped pulley grooves. The dimension of the pulley grooves are such that the ribs and grooves mate with total confinement and with no clearance space therebetween during operation of the belt over the pulley. The load is transmitted from the tension member of the belt to the pulley through the compressive force exerted on the confined rib material and the resultant forces exerted on the sidewalls of the pulley grooves. For the purposes of this invention, these belts will be referred to as plural V-ribbed belts. These plural V-ribbed belts have particular utility when used with small diameter pulleys in relatively light duty drives such as found on small equipment and appliances.

Belt drive assemblies including belts capable of driving from opposite surfaces are also known in the art. Synchronous drive belts, for example, having driving teeth on both the inside and outside surfaces of the belt have been used in various applications in which the inside teeth mesh with and drive certain of the pulleys of the drive and the outside teeth mesh with and drive certain other pulleys of the drive to transmit power therebetween. In addition, Case U.S. Pat. No. 3,151,491 discloses a transmission belt having driving teeth on one surface of the belt and a trapezoidal V-belt section on the other surface.

One belt combining the desirable features of both the synchronous drive belt and the plural V-ribbed belt as described above, is not known in the art. In the use of such a belt, it is contemplated that the driving teeth be provided in one portion of the belt to engage toothed pulleys and the V-shaped ribs be provided in the other portion of the belt to engage multi or plural grooved pulleys. In many belt drive assemblies in which such a unique driving belt could be utilized, the particular pulley arrangements do not suggest its use due primarily to the relatively small arc of contact necessitated between the plural V-ribbed portion of the transmission belt and the grooved pulley. This is true since the relatively small arc of contact or wrap angle is known to cause excessive stress on the apex or or narrow part of the V-shaped ribs as they ride with complete mating contact in the pulley grooves. The normal arc of contact or wrap angle between a belt and the pulley with which it is in engagement in a conventional belt drive assembly is from about 120° to about 180°.

It has been found that the disadvantages of the belt combining the features of the synchronous drive toothed belt and the plural V-ribbed belt can be overcome by the present invention that will be hereinafter described.

OBJECTS OF THE INVENTION

It is an object of this invention to provide a power transmission belt which will combine in one belt, the desirable features of both the synchronous drive belt and the plural V-ribbed belt.

It is another object of this invention to provide a belt drive assembly including a power transmission belt capable of driving from opposite portions thereof in which the arc of contact between a plural V-ribbed driving portion of the belt and the pulley with which it is in engagement is relatively small.

Other objects and advantages of this invention will become apparent hereinafter as the description thereof proceeds, the novel features, arrangements and combinations being clearly pointed out in the specification as well as the claims thereunto appended.

It has been found in accordance with the present invention that the beforementioned objects can be accomplished by providing a flexible power transmission belt used in conjunction with toothed and grooved pulleys of a belt drive assembly with the belt being capable of driving from opposite portions thereof to transmit power between the pulleys. The belt comprises a first layer of flexible resilient material extending longitudinally of the belt to define one driving portion thereof including a plurality of uniformly spaced teeth disposed generally transversely thereof adapted to mesh without change of pitch with teeth of the toothed pulley. The belt also includes a second layer of flexible material spaced from and substantially parallel to the first layer to define the other driving portion of the belt facing in the opposite direction to that of the first-mentioned driving portion. The second layer includes a plurality of substantially V-shaped ribs disposed generally longitudinally thereof with at least the major portion of each rib engaging the grooves of the grooved pulleys having corresponding contours thereto. A tension section embedded in the belt includes a tension member of high modulus essentially inextensible material and is disposed between the first and second layer substantially on the dedendum line of the teeth of the first layer. The first layer, second layer and tension section are bonded together to form an integral structure.

The above-mentioned objects are also accomplished by providing a belt drive assembly including a plurality of rigid pulleys, at least one of which is a toothed pulley having a plurality of radial teeth disposed around the circumference thereof and at least one of which is a grooved pulley having a plurality of substantially V-shaped continuous annular grooves extending circumferentially thereof. The belt drive assembly also includes driving means for affecting the rotation of one of the pulleys and an endless power transmission belt of the construction described above having one portion engaging the toothed pulley and the opposite portion engaging the grooved pulley. For many applications the pulley arrangement is such that the second-mentioned driving portion has an arc of contact with at least one of the grooved pulleys of less than 120° and often has an arc of contact of only from about 40° to about 60°, with the high tension thus required to drive the belt thereby subjecting the tension member of the belt to a high stress. This is in contradistinction to the normal or conventional arc of contact which is from about 120° to about 180°. According to one of the teachings of the present invention, each of the V-shaped ribs has a greater angle than the angle of the V-shaped groove of the pulley with which it is in engagement, so that the ribs do not mate completely with the V-shaped pulley grooves but are adapted to wear to a more correct or desired profile during operation of the belt, thereby alleviating the excessive stress to which the apex or narrow part of the rib is subjected.

The above-mentioned objects are further accomplished by providing a flexible power transmission belt of integral construction used in conjunction with pulleys of a belt drive assembly, at least one of which is a grooved pulley, and the belt being capable of driving from opposite portions thereof to transmit power between the pulleys from a power source. The belt comprises a first layer of flexible material extending longitudinally of the belt to define one driving portion thereof and a second layer of flexible material spaced from and substantially parallel to said first layer to define the other driving portion of the belt facing in the opposite direction to that of the first-mentioned driving portion. The second layer includes a plurality of substantially V-shaped ribs disposed generally longitudinally thereof and the major portion of each rib engages grooves of grooved pulleys having contours corresponding at least substantially thereto. Each of the ribs has a greater angle than the angle of the V-shaped groove of the pulley with which it is in engagement so that the ribs do not mate completely with the V-shaped pulley grooves but are adapted to wear to a more correct or desired profile during the operation of the belt. The second-mentioned driving portion has an arc of contact with at least one of the grooved pulleys of less than 120° with the pulley contacting surface of the ribs having a relatively low coefficient of friction to allow for slippage of the belt during periods of high stress. The belt further includes a tension section therein to provide longitudinal strength and stability.

According to the teachings of the present invention, one specific application in which such a unique combination belt may be used is in automotive systems employing various belt drives. For instance, the toothed portion or inside of the belt can be used to transmit power from a toothed crankshaft pulley to a similarly toothed overhead cam pulley with the plural V-ribbed portion or outside of the belt engaging a grooved pulley to operate the fan and water pump positioned on the same shaft. It is also possible that other pulleys which operate other accessories such as an alternator, may be included in the automotive system with the geometry of the particular belt drive assembly determining which pulleys are to be driven by the plural V-ribbed portion and which are driven by the toothed portion.

BRIEF DESCRIPTION OF THE DRAWINGS

In the drawings:
FIG. 1 is a side elevational view of the belt and drive belt assembly of this invention with parts broken away;
FIG. 2 is an enlarged fragmentary perspective view of the belt of this invention with parts being broken away to more clearly show the belt construction;
FIG. 3 is an enlarged sectional view of a portion of the belt drive assembly showing the arc of contact between the belt and one of the pulleys;
FIG. 4 is an enlarged sectional view taken on line 4—4 of FIG. 1;
FIG. 5 is a modification of the invention shown in FIGS. 2 and 4; and
FIG. 6 is another modification of the invention shown in FIGS. 2 and 4.

DESCRIPTION OF THE PREFERRED EMBODIMENTS

Referring now to the drawings, in FIGS. 1 through 4 a belt drive assembly 10 is shown in which a flexible power transmission belt 11 of this invention is employed, for example, in an automotive system. The unique combination belt 11 is capable of driving from opposite surfaces or portions thereof. In the particular arrangement shown, the belt 11 is used to transmit power from a toothed driving pulley 12 having a 3-inch diameter to a 6-inch diameter toothed driven pulley 13 and a 3-inch diameter grooved driven pulley 14 in a manner that will be hereinafter explained. The driving pulley 12, for example, may operate from the crankshaft of an automotive vehicle and the driven pulleys 13 and 14 may operate an overhead camshaft and a single or common shafted fan and water pump respectively.

The specific construction features of the belt 11 are best seen in FIG. 2. As illustrated, the belt 11 is of a reinforced unitary construction comprising bonded components. The belt 11 includes a first layer 15 of flexible resilient material. This is preferably a flexible polymeric material such as natural or synthetic rubber or other elastomeric material. The layer 15 extends longitudinally of the belt 11 to define one driving portion 16 thereof and includes a plurality of uniformly spaced teeth 17 disposed generally transversely of the belt 11. The teeth 17 are preferably formed by molding but may be ground or cast if desired. The teeth 17 also preferably include a wear facing 18 of textile fabric material, for example of woven nylon. Each tooth 17 is engineered and manufactured to a precise degree with very close tolerance being maintained so that during the operation of the belt drive assembly 10, the teeth 17 are adapted to mesh without change of pitch with the teeth 19 and 20 of toothed pulleys 12 and 13 as shown in FIG. 1.

The belt 11 also includes a second layer 21 of flexible material such as a suitable polymeric or elastomeric material spaced from and substantially parallel to the first layer 15 to define the other driving portion 22 of the belt 11 facing in the opposite direction to that of the first mentioned driving portion 16. The layer 21 includes a plurality of substantially V-shaped ribs 23 disposed generally longitudinally of the belt 11 in parallel relationship to each other. For reasons which will hereinafter become apparent, it is preferred that the ribs 23 are of a truncated transverse cross section and that the pulley contacting surfaces 24 of the ribs 23 have a relatively low coefficient of friction. Due largely to economic considerations, the ribs 23 are preferably ground or cut into the layer 21 of the belt 11 but may, if desired, also be formed by molding or casting procedures well known in the art. During the operation of the belt drive assembly 10 at least a major portion of each rib 23 engages the grooves 25 of the grooved pulley 14 having similar V-shaped contours corresponding at least substantially to the contours of the V-shaped ribs 23. This feature of the invention will be explained more fully with reference to FIG. 4.

A tension section 26 is also embedded in the belt 11 in order to provide the necessary longitudinal strength and stability. The tension section 26 includes a tension member 27 of high modulus, essentially inextensible material such as wrapped strands of glass fiber or steel. The tension member 27 is disposed between the layers 15 and 21 substantially on the dedendum line of the teeth 17 as is the well-known practice in regard to synchronous drive belts. (Case U.S. Pat. No. 2,507,852). The high-strength member 27 functions to prevent undue stretchability of the belt 11 and allows the teeth 17 to mesh more accurately with the pulley teeth 19 and 20 of the pulleys 12 and 13 respectively.

The first layer 15, second layer 21 and tension section 26 are bonded together to form an integral structure by conventional means such as vulcanization in a belt mold. The teeth 17 are preferably formed in the layer 15 during vulcanization in a suitable mold and the teeth 17 are subsequently ground into the second layer 21 by suitable grinding equipment.

The operation of the belt drive assembly 10 is shown specifically in FIGS. 1, 3 and 4. The belt 11 is trained around the pulleys 12 and 13. Each pulley 12 and 13 is composed of a rigid material such as steel and has a plurality of radial teeth 19 and 20 disposed around its circumference. The resilient teeth 17 of the toothed driving portion 16, which in this arrangement is on the inside of the belt 11, mesh without change of pitch with the rigid teeth 19 of pulley 12 and the rigid teeth 20 of pulley 13 thereby transferring power from pulley 12 to pulley 13 in the direction shown by the arrows in FIG. 1. The pulley 12 is driven by means (not shown) to effect its rotation. One or both of the pulleys 12 or 13 may include flanges 28 and 29 respectively which keep the belt 11 in proper alignment around the pulleys 12 and 13 during the operation of the assembly 10. However, in many instances neither of the toothed pulleys 12 or 13 need be flanged since the grooved pulley 14 provides the necessary belt alignment as will become apparent from the following discussion.

The grooved pulley 14 is also composed of a rigid material and is of the multi-V type having a plurality of substantially V-shaped continuous, annular grooves 25 extending circumferentially in the face thereof. The plural V-ribbed driving portion 22 located in this instance on the outside of the belt 11 comes in contact with the grooved pulley 14 with the ribs 23 engaging the pulley grooves 25 thereby driving or effecting the rotation of the pulley 14 and providing proper alignment for the belt 11 during the operation of the assembly 10.

The position of pulley 14 in the assembly 10 results in an arc of contact or wrap angle A between the outside driving portion 22 of the belt 11 and the pulley of about 50°. This angle may vary from about 40° to about 60° depending on the particular application. The arc of angle A is considerably less or smaller than in conventional applications in which the arc of contact between the belt and pulleys it contacts is from about 120° to about 180°. A relatively small arc or angle of contact of less than 120° with the required high tension results in a substantially increased stress or strand tension on the member 27 often approaching 200 pounds per strand. The resulting stress on the apex 30 or narrow part of each rib 23 is also considerable thereby necessitating stress alleviating alterations of the rib construction and configuration which are distinct departures from previously known accepted practice, as will become apparent with reference to FIG. 4.

The engagement between the ribs and the pulley grooves are best shown in FIG. 4. The ribs 23 of the plural V-ribbed driving portion 22 preferably have a greater angle X than the angle Y of the V-shaped grooves 25 of the pulley 14 with which it is in engagement so that the ribs 23 do not mate completely with the grooves 25 without a clearance space as is normally recommended for optimum operation of plural V-ribbed belts (J Adams, Jr. U.S. Pat. No. 2,728,239). Since the apex 30 of each rib 23 does not engage or contact the bottom 31 of the V-groove 25, undue stress does not result. In this regard, it has been determined that desirable results are attained when the rib angle X is from about 49° to about 55° (optimum angle of 52°) and the angle of Y of each pulley groove 25 is about 40° (most plural of multi V-grooved pulleys used in conjunction with plural V-ribbed belts have a standard angle of 40°). With these just-mentioned angles X and Y, only about one-third of each rib 23 extending from its base 32 or wide part is in initial engagement with each pulley groove. This surface of the rib 23 is referred to as the pulley contacting surface and is represented by numeral 24.

In practice, it should be realized that eventually the ribs 23 will wear to the more correct or desired profile and conform more closely to the contour of the V-shaped groove 25. Typically, the ribs 23 have a pitch of about 0.140 of an inch and a depth of about 0.100 of an inch. It has accordingly been further found that the optimum results are attained in reducing or alternating rib stress when the V-shaped ribs 23 are of a truncated transverse cross section as shown in FIG. 4 so that the rib 23 will never actually "bottom" or contact the bottom 31 of the pulley groove 25.

Because of the great stress the tension member 27 of the dual driving belts 11 are necessarily subject to in pulley arrangements resulting in small or relatively small arcs of contact between the belt and one or more of the pulleys, it is important that the belt be able to slip during periods when it is subjected to high loads. For this reason, at least the pulley contacting surfaces 24 of the ribs 23 should have a relatively low coefficient of friction to allow for slippage of the belt 11 during periods of high stress. This can be accomplished as shown in FIG. 5 by forming the ribs 33 of a fiber-loaded elastomeric material. The fibers 34 may be of a textile fabric material such as cotton linters or other fibrous material well known in the art. This means of attaining a lower coefficient of friction surface is most advantageously used when the ribs 33 are formed by a grinding operation. Another means of accomplishing a lower coefficient of friction surface is most advantageously used when the ribs 33 are formed by a grinding operation. Another means of accomplishing a lower coefficient of friction is to provide the ribs 35 with a facing 36 of textile fabric material such as cotton, rayon, nylon or polyester as shown in FIG. 6. The fabric facing 36 is most conveniently applied when the ribs 35 are formed by molding, for instance, as described in J Adams, Jr. U.S. Pat. No. 2,746,308. When the fabric facing 36 is used, it further strengthens the apex 37 of each rib 35, thereby they may seat lower in the pulley grooves during operation of the belt without causing damage to the apex 37 of the ribs 35. However, the fabric facing 36 is costly since it must be applied during a molding operation and consequently is of secondary importance because of its limited application.

It should be apparent to those skilled in the art that many other belt drive assemblies and resultant pulley arrangements are possible in which the unique power transmission belt of this invention can be utilized. For example, in other automotive system applications, other pulleys operating the alternator or other accessories may be present with the geometry of the particular belt drive determining which pulleys are driven by the plural V-ribbed portion of the belt and which are driven by the toothed portion of the belt. Although it should be apparent that the unique combination driving belts and belt drive assemblies of this invention are particularly appropriate when the arc of contact between one driving portion of the belt and pulley is small or relatively small, it should be equally obvious that the belt may be used in more conventional drives. In this regard it is contemplated that the plural V-ribbed portion of the belt may define not only the outer driving portion of the belt but the inner driving portion as well with the toothed portion defining the outer or opposite driving portion.

Those skilled in the art should also appreciate that the features of the invention described, particularly with reference to FIGS. 3 through 6, can apply to combination belts in which the driving portion opposite from that of the plural V-ribbed portion is other than a toothed or synchronous drive portion. For example, the other driving portion may be in the form of a similar plural V-ribbed portion or a conventional truncated V-belt portion. The important consideration is the relatively small arc of contact or wrap angle that the belt must negotiate during its operation.

While certain representative embodiments and details have been shown for the purpose of illustrating the invention, it will be apparent to those skilled in the art that various changes and modifications may be made therein without departing from the spirit or scope of the invention.

I claim:

1. A flexible power transmission belt used in conjunction with toothed and grooved pulleys of a belt drive assembly, said belt capable of driving from opposite portions thereof to transmit power between pulleys, said belt comprising:

A. a first layer of flexible resilient material extending longitudinally of the belt to define one driving portion thereof and including a plurality of uniformly spaced teeth disposed to extend generally transversely thereof and adapted to mesh without change of pitch with teeth of the toothed pulleys;

B. a second layer of flexible material spaced from and substantially parallel to said first layer to define the other driving portion of the belt facing in the opposite direction to that of the first mentioned driving portion, said second layer including a plurality of substantially V-shaped ribs disposed in parallel relation to each other across at least substantially the entire width of the belt and extending generally longitudinally thereof with at least the major portion of each rib engaging the grooves of the grooved pulleys having contours corresponding at least substantially thereto; and C. a tension section embedded therein including a tension member of high modulus essentially inextensible material disposed between said first and second layers substantially on the dedendum line of the teeth of said first layer, the first layer, second layer and tension section being bonded together to form an integral structure.

2. The belt as claimed in claim 1 wherein said second mentioned driving portion has an arc of contact with at least one of the grooved pulleys of less than 120°.

3. The belt as claimed in claim 2 wherein said second mentioned driving portion has an arc of contact with at least one of the grooved pulleys of from about 40° to about 60°.

4. The belt as claimed in claim 2 wherein each of the V-shaped ribs has a greater angle than the angle of the V-shaped groove of the pulley with which it is in engagement so that said ribs do not mate completely with the V-shaped pulley grooves but are adapted to wear to a more desired or correct profile during operation of the belt.

5. The belt as claimed in claim 4 wherein each V-shaped rib has an angle of from about 49° to about 55° and the angle of each V-shaped groove of the pulley is about 40° and about one-third of each rib extending from its base is in initial engagement therewith.

6. The belt as claimed in claim 2 wherein the V-shaped ribs are of a truncated transverse cross section.

7. The belt as claimed in claim 2 wherein said second layer is of a flexible polymeric material and at least the pulley contacting surface of the ribs has a relatively low coefficient of friction to allow for slippage of the belt during periods of high stress.

8. The belt as claimed in claim 7 wherein the ribs of said second layer are formed from a fiber-loaded elastomeric material.

9. The belt as claimed in claim 7 wherein the ribs of said second layer include a facing of textile fabric material.

10. In a belt drive assembly including the combination of toothed and grooved pulleys and a power transmission belt trained around said pulleys to transmit power therebetween with one side of the belt engaging the toothed pulleys and the opposite side engaging the grooved pulleys, the improvement wherein said belt comprises:

A. a first layer of flexible resilient material extending longitudinally of the belt to define one driving portion thereof and including a plurality of uniformly spaced teeth disposed to extend generally transversely thereof and adapted to mesh without change of pitch with teeth of the toothed pulleys;

B. a second layer of flexible material spaced from and substantially parallel to said first layer to define the other driving portion of the belt, said second layer including a plurality of substantially V-shaped ribs disposed in parallel relation to each other across at least substantially the entire width of the belt and extending generally longitudinally thereof and facing in the opposite direction to that of the teeth of the first layer with at least the major portion of each rib engaging the grooves of the grooved pulleys having contours corresponding at least substantially thereto; and C. a tension section embedded therein including a tension member of high modulus essentially inextensible material disposed between said first and second layers substantially on the dedendum line of the teeth thereof, the first layer, second layer and tension section being bonded together to form an integral structure.

11. A belt drive assembly comprising a plurality of rigid pulleys, at least one of which is a toothed pulley having a plurality of radial teeth disposed around the circumference thereof and at least one of which is a grooved pulley having a plurality of substantially V-shaped continuous annular grooves extending circumferentially in the face thereof, driving means for effecting the rotation of one of said pulleys, and an endless power transmission belt having one portion engaging the toothed pulley and the opposite portion engaging the grooved pulley, said belt comprising:

A. a first layer of flexible resilient material extending longitudinally of the belt to define one driving portion thereof and including a plurality of uniformly spaced teeth disposed to extend generally transversely thereof and adapted to mesh without change of pitch with teeth of the toothed pulleys;

B. a second layer of flexible material spaced from and substantially parallel to said first layer to define the other driving portion of the belt, said second layer including a plurality of substantially V-shaped ribs disposed in parallel relation to each other across at least substantially the entire width of the belt and extending generally longitudinally thereof with at least the major portion of each rib engaging the grooves of the grooved pulleys having contours corresponding at least substantially thereto; and C. a tension section embedded therein including a tension member of high modulus essentially inextensible material disposed between said first and second layers substantially on the dedendum line of the teeth thereof, the first layer, second layer and tension section being bonded together to form an integral structure.

12. The belt as claimed in claim 11 wherein said second-mentioned driving portion has an arc of contact with at least one of the grooved pulleys of less than 120°.

13. The belt as claimed in claim 12 wherein said second-mentioned driving portion has an arc of contact with at least one of the grooved pulleys of from about 40° to about 60°.

14. The belt as claimed in claim 12 wherein each of the V-shaped ribs has a greater angle than the angle of the V-shaped groove of the pulley with which it is in engagement so that said ribs do not mate completely with the V-shaped pulley grooves but are adapted to wear to the correct profile during operation of the belt.

15. The belt as claimed in claim 14 wherein the V-shaped rib has an angle of from about 49° to about 55° and the angle of each V-shaped groove of the pulley is about 40° and about one-third of each rib extending from its base is in initial engagement therewith.

16. A flexible power transmission belt of integral construction used in conjunction with pulleys of a belt drive assembly at least one of which is a grooved pulley, said belt capable of driving from opposite portions thereof to transmit power between pulleys from a power source, said belt comprising:

A. a first layer of flexible material extending longitudinally of the belt to define one driving portion thereof;

B. a second layer of flexible material spaced from and substantially parallel to said first layer to define the other driving portion of the belt facing in the opposite direction to that of the first-mentioned driving portion, said second layer including a plurality of substantially V-shaped ribs disposed generally longitudinal thereof and the major portion of each rib engages grooves of grooved pulleys having corresponding contours thereto with each of the ribs having a greater angle than the angle of the V-shaped groove of the pulley with which it is in engagement so that the ribs do not mate completely with the V-shaped pulley grooves but are adapted to wear to the correct profile during operation of the belt, and said second mentioned driving portion having an arc of contact with at least one of the grooved pulleys of less than 120° with the pulley contacting surface of the ribs having a relatively low coefficient of friction to allow for slippage of the belt during periods of high stress; and C. a tension section therein to provide longitudinal strength and stability.

17. The belt as claimed in claim 16 wherein said first layer is of a flexible polymeric material and includes a plurality of uniformly spaced teeth disposed generally transversely thereof and adapted to mesh without change of pitch with teeth of a toothed pulley of the belt drive assembly and said tension section includes a tensile member of high modulus essentially inextensible material disposed between said first and second layers substantially on the dedendum line of the teeth of said first layer.

18. The belt as claimed in claim 16 wherein said second-mentioned driving portion has an arc or contact with at least one of the grooved pulleys of from about 40° to about 60°.

19. The belt as claimed in claim 16 wherein the V-shaped rib has an angle of from about 49° to about 55° and the angle of the V-shaped groove of the pulley is about 40° and about one-third of each rib extending from its base is in initial engagement therewith.

20. The belt is claimed in claim 16 wherein the V-shaped ribs are of a truncated transverse cross section.

21. The belt as claimed in claim 16 wherein the ribs of the second layer are formed from a fiber-loaded elastomeric material.

22. The belt as claimed in claim 16 wherein the ribs of said second layer include a facing of textile fabric material.

* * * * *